United States Patent
Kvesic et al.

(10) Patent No.: US 11,378,416 B2
(45) Date of Patent: Jul. 5, 2022

(54) METHOD FOR WIRELESS TRANSMISSION OF TIME-CRITICAL DATA, IN PARTICULAR ALARM DATA, FROM A BATTERY-OPERATED METER

(71) Applicant: DIEHL METERING SYSTEMS GMBH, Nuremberg (DE)

(72) Inventors: Adrian Kvesic, Fuerth (DE); Petra Joppich-Dohlus, Rathsberg (DE); Christoph Schmidt, Nuremberg (DE); Stefan Schmitz, Nuremberg (DE); Christian Jambor, Nuremberg (DE)

(73) Assignee: Diehl Metering Systems GmbH, Nuremberg (DE)

( * ) Notice: Subject to any disclaimer, the term of this patent is extended or adjusted under 35 U.S.C. 154(b) by 14 days.

(21) Appl. No.: 16/926,957

(22) Filed: Jul. 13, 2020

(65) Prior Publication Data
US 2021/0010825 A1    Jan. 14, 2021

(30) Foreign Application Priority Data

Jul. 11, 2019   (DE) ............................ 102019004872

(51) Int. Cl.
   *G01D 4/00*    (2006.01)
   *H04Q 9/02*    (2006.01)
   (Continued)

(52) U.S. Cl.
   CPC ............... *G01D 4/004* (2013.01); *H04Q 9/02* (2013.01); *H04W 4/38* (2018.02); *H04W 76/12* (2018.02);
   (Continued)

(58) Field of Classification Search
   None
   See application file for complete search history.

(56) References Cited

U.S. PATENT DOCUMENTS

2014/0028469 A1*  1/2014  Ali .................... G08C 19/00
                                                340/870.03
2017/0223628 A1*  8/2017  Snyder .............. H04W 52/0216

FOREIGN PATENT DOCUMENTS

| EP | 1837633 A1 | 9/2007 |
| EP | 1850500 A1 | 10/2007 |
| WO | 2016166127 A1 | 10/2016 |

* cited by examiner

*Primary Examiner* — Curtis A Kuntz
*Assistant Examiner* — Jerold B Murphy
(74) *Attorney, Agent, or Firm* — Laurence A. Greenberg; Werner H. Stemer; Ralph E. Locher

(57) ABSTRACT

A method for wireless transmission of time-critical data, in particular alarm data, from a battery-operated meter, preferably a consumption meter, to a preferably likewise battery-operated wireless communication module uses a short-range wireless standard, in which meter and wireless communication module act as master or slave, or vice versa, meter and wireless communication module have been coupled in advance, meter data are sent from the meter to the wireless communication module over a wireless communication link and the meter data differ from the time-critical data. An active link is established between meter and wireless communication module to send the meter data and/or time-critical data from the meter to the wireless communication module. First advertising events are sent to initiate establishing communication for transmitting the meter data, and second advertising events are sent to initiate establishing communication for transmitting the time-critical data.

15 Claims, 5 Drawing Sheets

(51) Int. Cl.
*H04W 4/38* (2018.01)
*H04W 76/12* (2018.01)
(52) U.S. Cl.
CPC ..... *H04Q 2209/43* (2013.01); *H04Q 2209/60* (2013.01)

METHOD FOR WIRELESS TRANSMISSION OF TIME-CRITICAL DATA, IN PARTICULAR ALARM DATA, FROM A BATTERY-OPERATED METER

CROSS-REFERENCE TO RELATED APPLICATION

This application claims the priority, under 35 U.S.C. § 119, of German Patent Application DE 10 2019 004 872, filed Jul. 11, 2019; the prior application is herewith incorporated by reference in its entirety.

BACKGROUND OF THE INVENTION

Field of the Invention

The present invention relates to a method for wireless transmission of time-critical data, in particular alarm data, from a battery-operated meter, preferably a consumption meter, to a preferably likewise battery-operated wireless communication module in a short-range wireless standard, in which the meter and the wireless communication module act as master or slave, or vice versa, the meter and wireless communication module have been coupled in advance, meter data is sent from the meter to the wireless communication module over a wireless communication link, the meter data differs from the time-critical data, an active link is established between the meter and the wireless communication module for the purpose of sending the meter data and/or time-critical data from the meter to the wireless communication module, and first advertising events are sent in order to initiate establishing communication for the purpose of transmitting the meter data.

The meters of interest in this case are devices for detecting individual, different types of household utility supply such as electricity, cold water, hot water, heat and gas, for instance. Such meters are usually installed in a fixed position and generate meter data, which is received by a data collector or concentrator usually intended for a plurality of meters, and passed to a head-end, in which the meter data from the meters is managed and analyzed. Meters are usually operated in such a way that they are energy self-sufficient, and therefore include a battery as an energy source, the lifetime of which battery also determines the operating life of the meter. In order to make the operating life of the meter as long as possible, there is particular interest in keeping the energy consumption of the meter as low as possible.

Hence meter data is not transmitted continuously from each meter to the data collector, but only at certain times. A wireless communication link is consequently established for the transmission at specified times over certain time intervals. There has been a problem until now that, in the event of a sudden occurrence of a time-critical or unusual incident, i.e. an incident of a significance requiring immediate notification, only a transmission at the predefined times was previously possible for that purpose. That resulted in the disadvantage that time-critical incidents could not be identified promptly enough, and consequently could not be processed quickly enough.

In the present case, a time-critical incident is understood to mean an incident that may cause an alarm to be triggered, for instance an attempt to tamper with the meter, a suddenly appearing change in situation relating to the type of supply, for instance a burst water pipe or other fault in the meter and/or in the supply network, etc. Such time-critical incidents hence need to be detected as promptly as possible in order to allow rapid handling, or to be able to document it at least correspondingly promptly. There is a conflict, however, between prompt detection and minimum possible energy consumption of the meter, which is battery-operated long-term in an energy self-sufficient manner, or of a correspondingly operated data collector.

Description of the Related Art

European Patent Application EP 1 837 633 A1 relates to an apparatus for detecting and signaling a leak in piping installed in a building. In that case, a consumption meter, which includes leak detection devices, communicates by radio with a receiver, which communicates over a wired connection to a further radio transceiver including a signal generator. The radio transceiver communicates with further corresponding, identical apparatuses by radio, thereby creating a network for multiple alarm-signal output in different regions of the building.

International Publication WO 2016/166127 A1 discloses an apparatus and a method for transmitting consumption data from a consumption meter in a radio communication system including a plurality of end points, which are in radio-communication through data transmission units with a data collector, which in turn is in radio-communication with a data management system. In that case, the data management system defines, in an activation message, for at least one end point, a communication path between the at least one end point and the data collector according to external parameters, and transmits that message to the data collector, wherein information about external parameters is collected along the communication path and conveyed to the data management system. For that purpose, the data transmission unit sends out at predetermined time intervals a ready-to-receive message containing identification information in order to signal a readiness to receive data, wherein the data transmission unit, after sending out the ready-to-receive message, switches into a time-limited receive mode, in which it is ready to receive the activation message from a neighboring data transmission unit or from the data collector.

European Patent EP 1 850 500 relates to a data acquisition and control system including data transmission over radio paths and electrical power distribution networks, and methods for that purpose. In that case, meter data and alarm information are fed into a communication gateway through power supply lines and coupling modules.

SUMMARY OF THE INVENTION

It is accordingly an object of the invention to provide a method for wireless transmission of time-critical data, in particular alarm data, from a battery-operated meter, which overcomes the hereinafore-mentioned disadvantages of the heretofore-known methods of this general type and which allows real-time detection of time-critical states with minimized energy consumption.

With the foregoing and other objects in view there is provided, in accordance with the invention, a method for wireless transmission of time-critical data, in particular alarm data, from a battery-operated meter, preferably a consumption meter, to a preferably likewise battery-operated wireless communication module in a short-range wireless standard, in which the meter and the wireless communication module act as master or slave, or vice versa, the meter and wireless communication module have been coupled in advance, meter data is sent from the meter to the wireless communication module through a wireless communication link, the meter data differs from the time-critical data, an active link is established between the meter and the wireless communication module for the purpose of sending the meter data and/or time-critical data from the meter to the wireless communication module, first advertising events are sent in order to initiate establishing communication for the purpose of transmitting the meter data, and second advertising events are sent in order to initiate establishing communication for the purpose of transmitting the time-critical data.

The dependent claims contain expedient embodiments of the method.

In accordance with the method according to the invention, by using second advertising events in addition to first advertising events, which are intended for establishing communication between the meter and the wireless communication module for the transmission of the meter data, it is possible, by establishing wireless communication quickly and smoothly, to transmit time-critical data, in particular alarm data, independently of the transmission of the meter data, after a time-critical, unforeseen incident occurs. The advertising events are awareness instructions, i.e. data packets that are sent out in order to enable other communication nodes to receive (scan) these data packets and thereby establish a wireless communication link. The second advertising events are preferably "directed" advertising events, i.e. those advertising events that contain an address by the communication node initiating the same.

The second advertising events are preferably sent out periodically, for example at intervals of one minute. The partner node recognizes these second advertising events as a specific "instruction" to establish a wireless communication channel for conveying the time-critical data, and scans the surrounding area for the arrival of such second advertising events. If second advertising events are detected, wireless communication is established for transmitting the time-critical data.

The periodicity of the second advertising events is higher than that of the first advertising events. This makes it possible to detect and convey the time-critical data in real time.

According to a particular embodiment of the invention, the second advertising events are sent out only over a limited time period. So long as a time-critical incident does not occur within this time period, then the sending-out thereof ceases again. This allows additional savings in electrical energy.

The meter data is preferably sent from the meter to the wireless communication module at data transfer intervals, i.e. at respective specified times. Thus, the meter data is transmitted from the meter to the wireless communication module only at certain times, for instance every 15 minutes. The second advertising events can be sent out expediently between these data transfer intervals.

They can be sent out either over the entire period or preferably only over a sub-period within the data transfer intervals, which is preferable in terms of energy.

In the course of the method according to the invention, the meter can act as master, and the wireless communication module as slave, or vice versa.

If the meter is acting as master, it assumes a "listening role," while the wireless communication module as slave sends out the second advertising events. When a time-critical incident occurs at the meter, the meter switches on its previously deactivated radio interface. A wireless communication link is established between the meter and the wireless communication module, and the time-critical data is transmitted from the meter to the wireless communication module. It is hence possible to establish wireless communication quickly and smoothly when an alarm occurs. The battery of the meter and the wireless communication module is also conserved at the same time.

Alternatively, it is also possible, for establishing the wireless communication channel for transmitting time-critical data, for the meter and the wireless communication module to swap roles. In this case, the wireless communication module assumes a "listening role" by it being this module rather than the meter that scans its surrounding area for second advertising events. When a time-critical incident occurs at the meter, second advertising events are sent out by the meter. Upon the wireless communication module receiving second advertising events, a wireless communication link is established between the meter and the wireless communication module, and the time-critical data is transmitted from the meter to the wireless communication module.

In the latter case, second advertising events are sent from the meter only when a time-critical incident, which has been categorized as such by the meter, has taken place. It is also the case in this embodiment that the second advertising events act as an "instruction" for the wireless communication module that a wireless communication channel is meant to be established.

For the purpose of defining the times at which the second advertising events are sent out and received, it is advantageous if the meter and the wireless communication module synchronize with each other preferably whenever communication is established for transmission of the meter data.

The meter and the wireless communication module are each in a sleep state (idle mode) as long as no first or second advertising events are sent out by the meter and/or by the wireless communication module, and as long as there is no wireless communication link for transmitting the meter data or time-critical data.

The meter and the wireless communication module are each installed in a fixed position.

In a network, preferably time-critical data from a plurality of meters are transmitted to one or more wireless communication modules of the network.

As far as the short-range wireless standard is concerned, this is a wireless standard that can be used by a meter to network with a wireless communication module in a surrounding area of 20 meters maximum. The short-range wireless standard is preferably the BLE (Bluetooth Low Energy) short-range wireless standard.

According to an advantageous embodiment, the time-critical data that the wireless communication module has received from the meter concerned is transmitted onwards to a remote head-end.

The time-critical data is transmitted from the wireless communication module to the head-end expediently on a WAN basis.

Other features which are considered as characteristic for the invention are set forth in the appended claims.

Although the invention is illustrated and described herein as embodied in a method for wireless transmission of time-critical data, in particular alarm data, from a battery-operated meter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
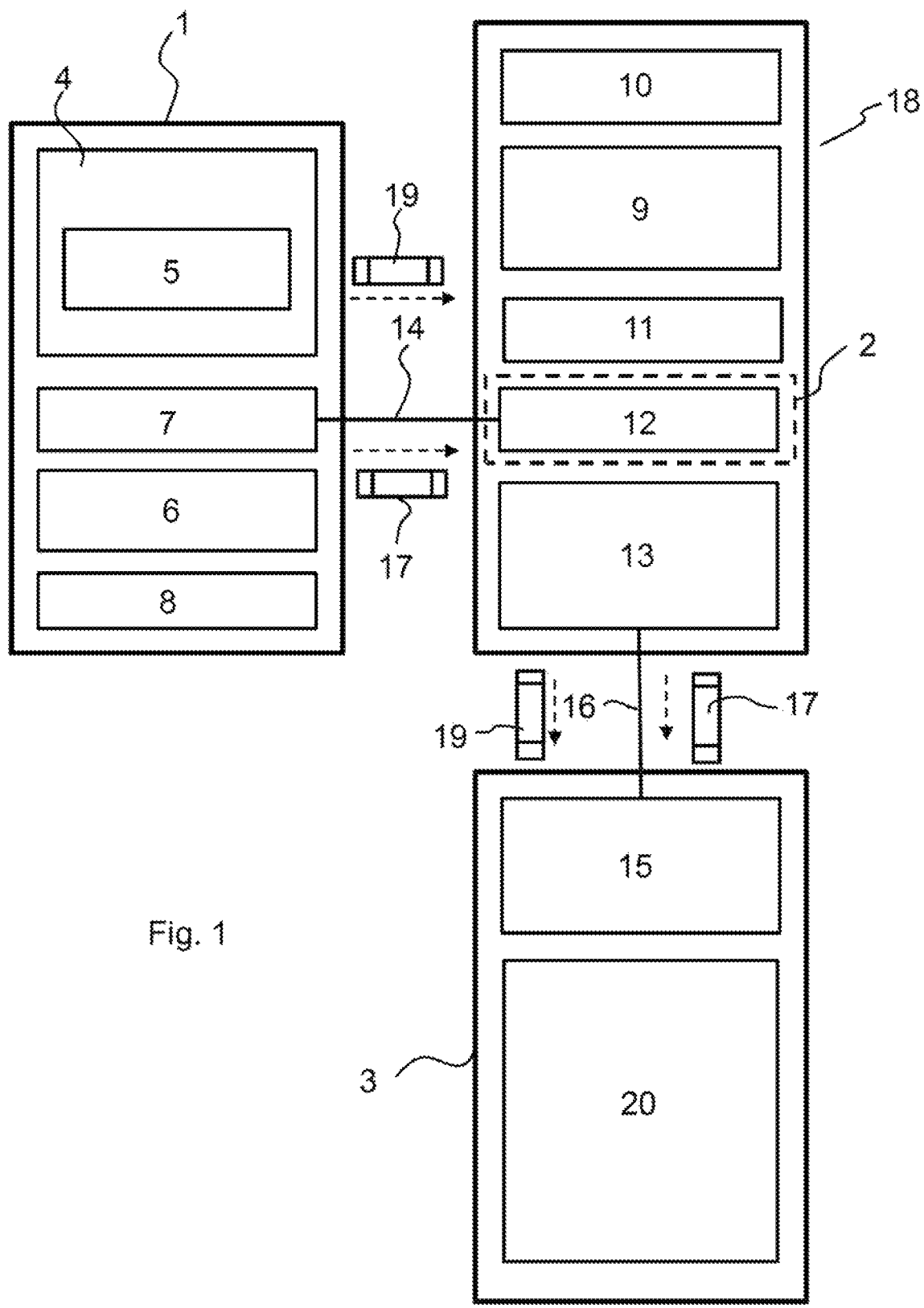
FIG. 1 is a highly simplified block diagram of a meter, a wireless communication module and a head-end.

Referring now to the figures of the drawings in detail and first, particularly, to FIG. 1 thereof, there is seen a meter 1, preferably a consumption meter, which usually is installed in a fixed position in a building, and is intended to generate meter data 17, e.g. consumption data for different types of supply such as e.g. electricity, cold water, hot water, heat, gas, etc. Instead of consumption data, or in addition to consumption data, the meter data 17 can also include status data such as e.g. temperature, water quality, water hardness, period of use, etc. Depending on an application 4, these data is detected in the meter 1 and stored in its memory 5.

The meter 1 also includes a microprocessor 6 for the purpose of sequence control. The meter 1 additionally includes a battery 8 for supplying energy.

Usually, a plurality of meters 1 is combined in one acquisition network in a building. In this case, the meters 1 are positioned at different locations in the building and each equipped with its own battery.

In order to gather the meter data 17 of a meter 1, a so-called data collector 18 is provided, which usually can likewise be installed in a fixed position in the building in the vicinity of the meter(s) 1, and likewise has a memory 10, a microprocessor 9 and a battery 11.

For wireless transmission of the meter data 17 from the meter 1 to the data collector 18, the meter 1 includes a radio interface 7, and the data collector 18 includes a wireless communication module 2, preferably a so-called radio network adapter (RNA) module, which likewise has a radio interface 12. Both radio interfaces 7, 12 facilitate a radio link 14 that works in a short-range wireless standard, thereby ensuring far lower energy consumption, for instance in comparison with a mobile communications standard.

The wireless standard involved in this case is in particular a standard that can be used by the meter 1 to network with the wireless communication module 2 in a surrounding area of approximately 20 meters maximum. The BLE standard as it is known (Bluetooth Low Energy short-range wireless standard) is particularly advantageous for this purpose. A short-range wireless standard of this type allows the data collector 18 to read, with comparatively low energy consumption, meter data 17 at different locations within a building in an energy-efficient manner and at sufficient information density.

The short-range wireless standard is used to create a modular configuration in which one or more meters 1 can be coupled to one or more wireless communication modules 2 of one or more data collectors 18 for the purpose of transmitting the meter data 17.

The meter data 17 read from the data collector 18 is transmitted from the data collector to a head-end 3 at a remote location, in which a database 20 is located for managing and analyzing the meter data 17 of a multiplicity of consumers. Usually, the head-end 3 is operated and/or managed by a utility company (energy supplier, water supplier, heat supplier, etc.).

The operator of the database 20 of the head-end 3 is increasingly interested in not just the meter data 17 but also time-critical data 19, which appears unexpectedly, i.e. suddenly, in the region of the meter 1 concerned. A time-critical incident is understood to mean in particular an incident that may cause an alarm to be triggered, for instance an attempt to tamper with a meter, a suddenly appearing change in situation relating to the type of supply, for instance a burst water pipe or other fault in the meter and/or in the supply network itself. Such time-critical incidents can be extremely varied. Nonetheless, they always need to be detected as promptly as possible in order to allow rapid handling or they at least need for documentation having a corresponding time association to be possible.

The meter data 17 is transmitted to the head-end 3 over a WAN connection 16 (Wide Area Network connection) having a corresponding WAN interface 13 or WAN access point. A WAN network is a network that covers a large geographical area, in particular networks that are maintained and operated by providers and telecommunication suppliers.

Figure 2:
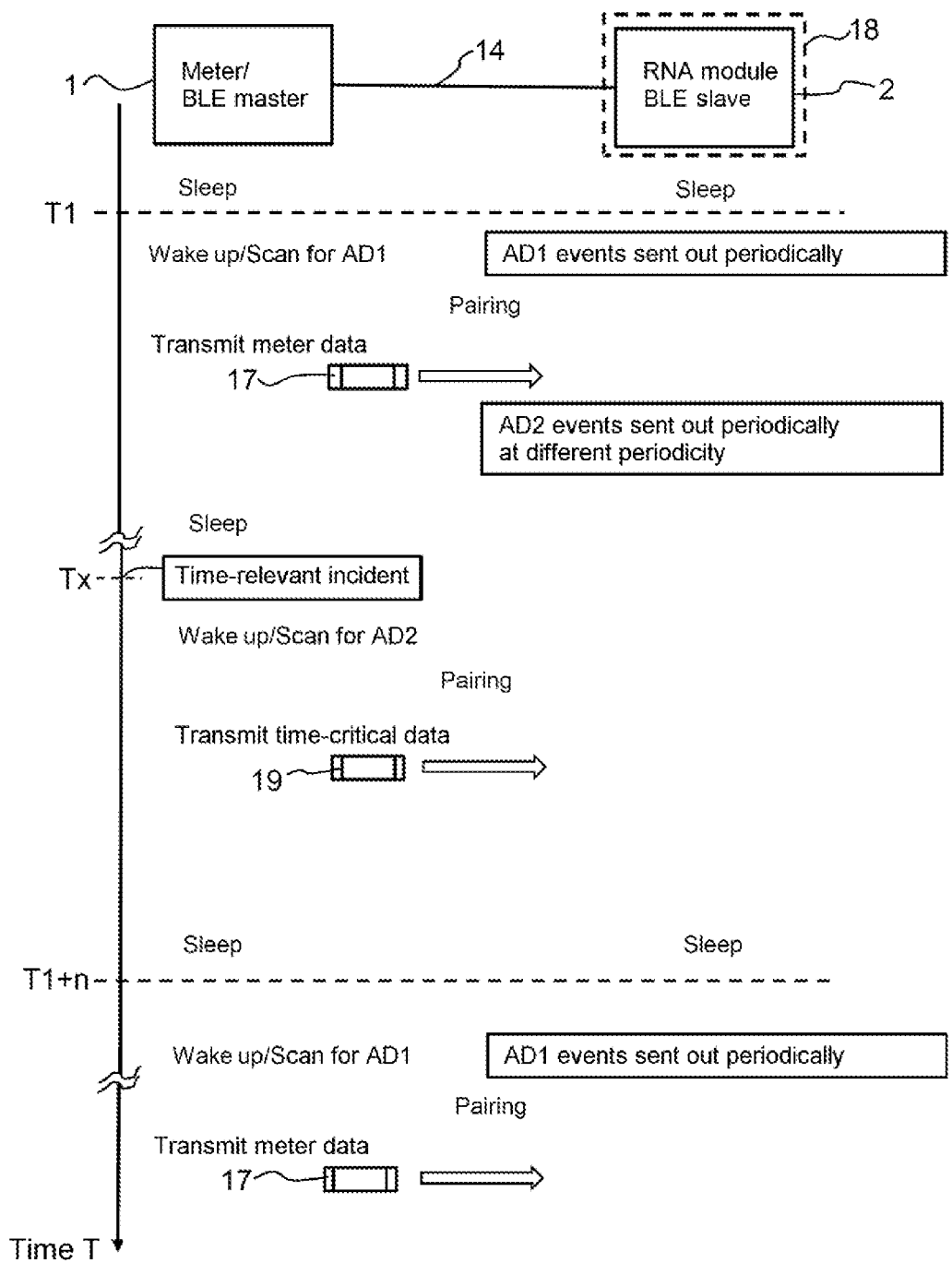
FIG. 2 is a highly simplified diagram showing an overview of a first embodiment of the method according to the invention.

FIG. 2 illustrates an embodiment of the method for wireless transmission of time-critical data 19, in particular alarm data, from the meter 1 to the wireless communication module 2 (RNA module) of the data collector 18, where the BLE wireless standard is preferably used in this case as the short-range wireless standard. In this figure, the meter 1 acts as the BLE master, and the wireless communication module 2 as the BLE slave.

In the method, predefined states are specified in the meter 1, and a time-critical incident and/or an alarm is initialized when those states occur in the meter 1. For this purpose, time-critical data 19 and/or alarm data are generated in the meter 1 in the application 4 thereof.

One-off coupling of the meter 1 and the wireless communication module 2 takes place at the start, so that the meter 1 and the wireless communication module 2 "recognize" each other in the network. This involves defining identification, authentication and encryption of the wireless communication channel between the two specific nodes.

During use, the communication channel between the meter 1 and the wireless communication module 2 is inactive in order to reduce the power consumption. The meter 1 and the wireless communication module 2 are in a sleep state. The radio interfaces 7, 12 are in the off state during this time span.

Both wake up simultaneously at fixed time intervals, for instance every 15 minutes. In the course of establishing communication, the meter 1 as BLE master assumes a listening role (scanning for AD1), whereas the wireless communication module 2 as BLE slave sends out first advertising events AD1 periodically. As soon as the meter 1 receives the first advertising events AD1, the link is established between the meter 1 and the wireless communication module 2 (pairing). Then the meter data 17 is transmitted from the meter 1 to the wireless communication module 2 over the radio link 14. Thereafter, the meter 1 goes back into idle (sleep) mode.

According to the concept of the invention, the wireless communication module 2 thereafter transmits further, i.e. second, advertising events AD2. These second advertising events AD2 are sent at time intervals that are very short in comparison with the first advertising events AD1, for example at intervals of one minute.

The meter 1 knows the periodicity of the second advertising events AD2, and interprets these as an "invitation" to transmit time-critical data 19. When a time-critical incident occurs at time Tx, this is ascertained in the meter. In this case, the meter 1 switches on its radio interface 7 and scans for second advertising events AD2. As soon as it has received these, a link is established between the meter 1 and the wireless communication module 2 (pairing), whereupon time-critical data 19 associated with the time-critical incident is transmitted over the radio link 14 in the short-range wireless standard to the wireless communication module 2.

Should there be no time-critical incident at the meter 1 during the time period of the periodic sending-out of the second advertising events AD2, i.e. there is no response from the meter, the wireless communication module 2 goes back into idle (sleep) mode. The radio interface 7 of the meter 1 hence needs to be in the on state only when a time-critical incident appears at the meter 1. The electricity consumed by the meter 1 and also by the wireless communication module 2 can hence be significantly reduced. The link is established and data transferred in accordance with the procedures specified in the short-range wireless standard.

Figure 3:
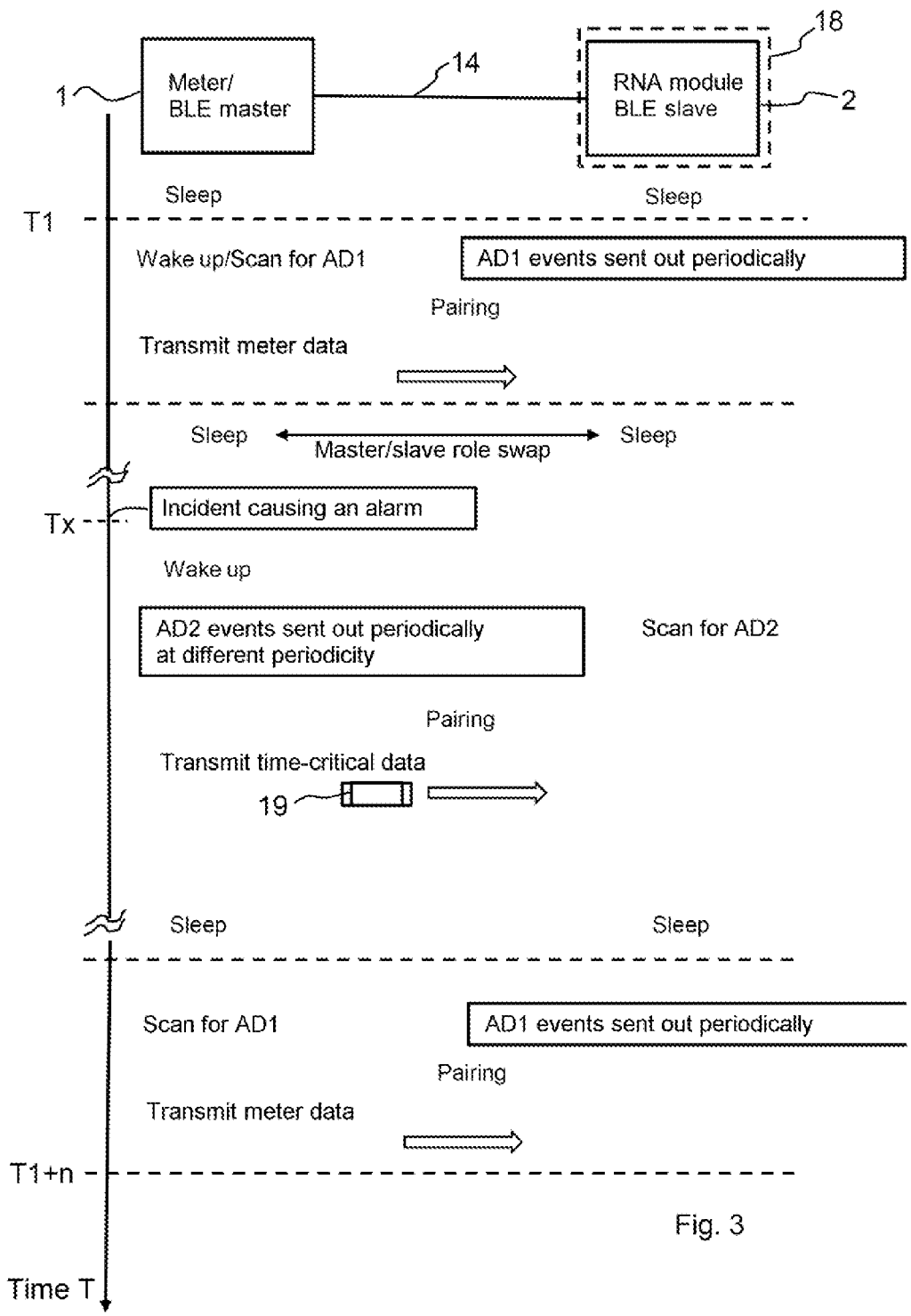
FIG. 3 is a highly simplified diagram showing an overview of a second embodiment of the method according to the invention.

In the alternative embodiment shown in FIG. 3, a role swap between the meter 1 and the wireless communication module 2 takes place between the data transfer intervals T1 and T1+n. The meter 1 becomes the BLE slave, and the wireless communication module 2 becomes the BLE master. The wireless communication module 2 scans for second advertising events AD2 from the meter 1 in predefined time intervals of a short period. These time intervals are known in the meter 1. The meter 1 only wakes up after a time-critical incident Tx occurs, and starts to send second advertising events AD2. These are received by the wireless communication module 2. Wireless communication is thereupon established (pairing), during which the time-critical data 19 are transmitted from the meter 1 to the wireless communication module 2 over the radio link 14. Then the link is terminated, and the meter 1 and the wireless communication module 2 go back into idle (sleep) mode.

Figure 4:
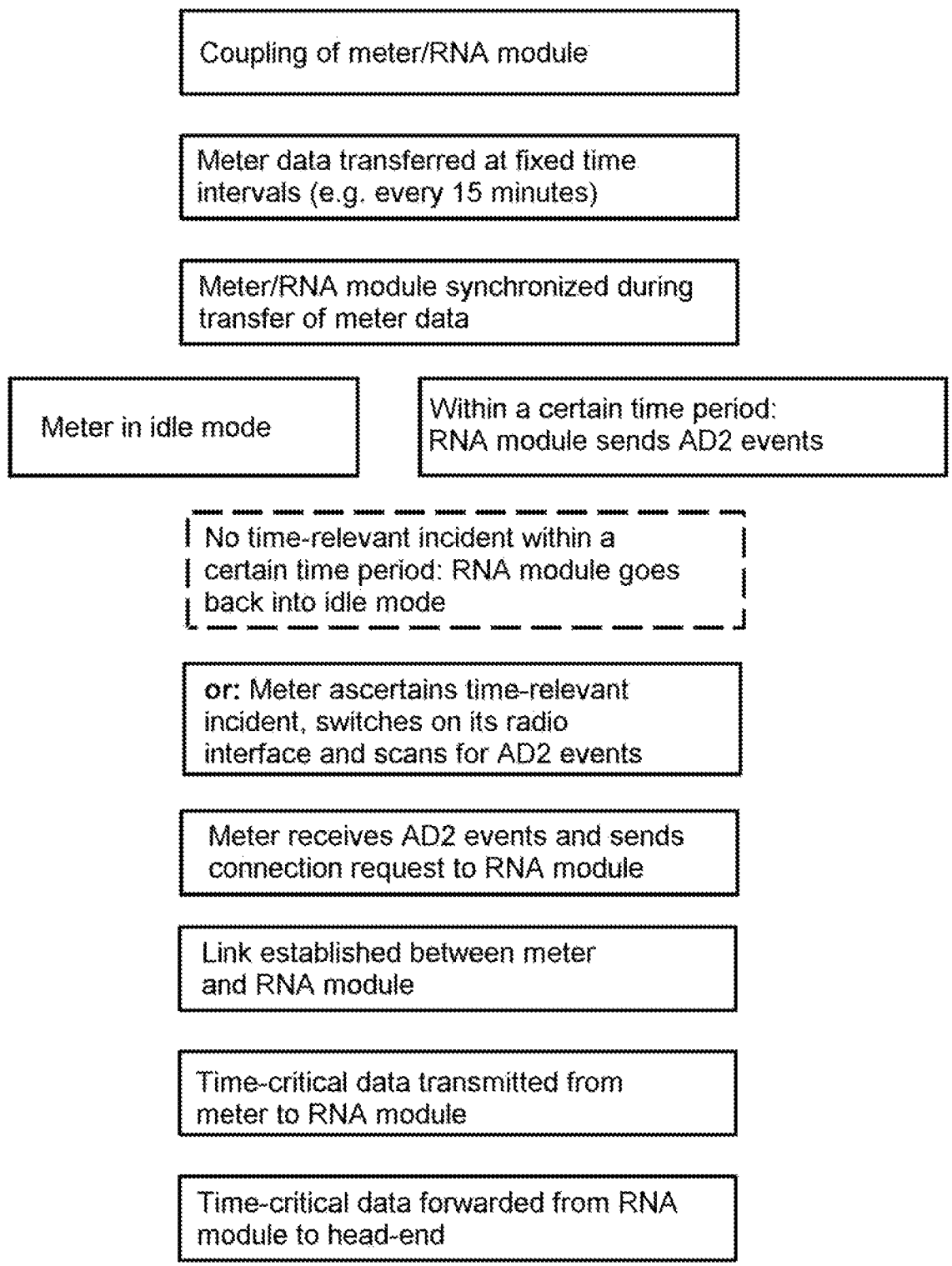
FIG. 4 is a highly simplified flow diagram of a sequence for the transmission of time-critical data according to the embodiment of the method shown in FIG. 2.
Figure 5:
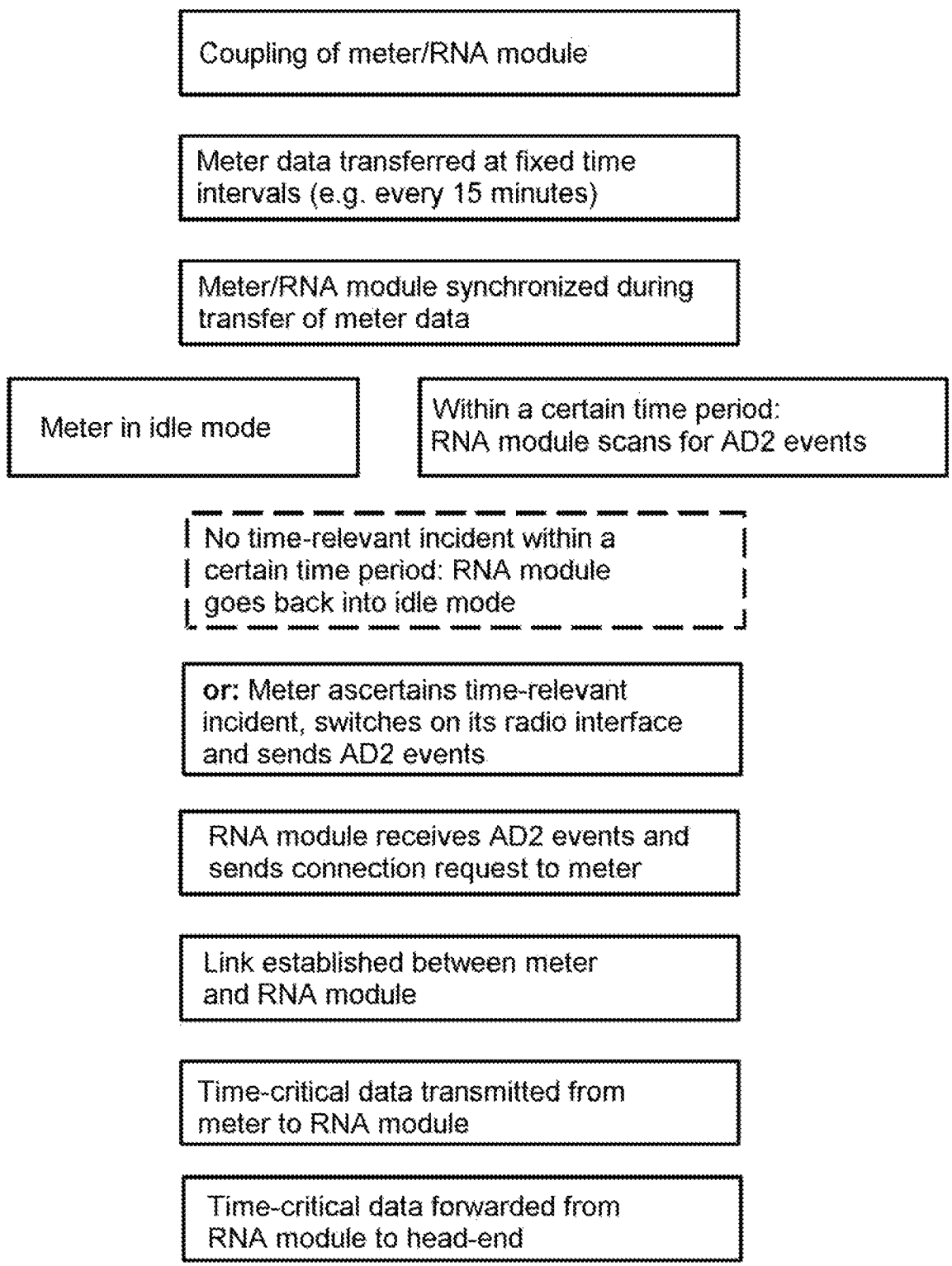
FIG. 5 is a highly simplified flow diagram of a sequence for the transmission of time-critical data according to the embodiment of the method shown in FIG. 3.

The two alternative procedures shown in FIGS. 2 and 3 each have in common that the meter(s) 1 is/are coupled in advance to the wireless communication module 2 or RNA module, and that meter data are transferred at fixed time intervals (see FIGS. 4 and 5). They also have in common that the meter 1 is synchronized with the wireless communication module 2 or RNA module when the meter data is transferred. The meter 1 identifies therefrom when it must start the scanning in order to be certain to receive second advertising events AD2 from the wireless communication module 2.

These second advertising events AD2 are sent by the wireless communication module 2 within a certain time period. If a time-critical incident does not arise within a certain time period or within the time period of sending the second advertising events AD2, the wireless communication module 2 or RNA module goes back into idle mode.

On the other hand, if the meter 1 ascertains a time-critical incident, it switches on its radio interface 7 and scans for the second advertising events AD2. It knows the time at which the sending-off takes place because of the aforementioned synchronization. As soon as the meter 1 has received a second advertising event AD2, it sends a connection request to the wireless communication module 2, whereupon a wireless communication link is established between the meter 1 and the wireless communication module 2 or RNA module. Within this link, time-critical data 19 are transmitted from the meter 1 to the wireless communication module 2. From there, the time-critical data 19 can be transmitted by WAN onwards to the head-end 3.

The method sequence described in FIG. 5 corresponds to the alternative embodiment shown in FIG. 3, in which, as a result of the role swap between the meter 1 and the wireless communication module 2, when a time-critical incident occurs, the meter 1 switches on its radio interface 7 and sends out second advertising events AD2, which the wireless communication module 2 or RNA module receives, and accordingly sends a connection request to the meter 1. The wireless communication channel is established, and the data are forwarded to the head-end 3, in the same way as in the previously described embodiment.

By virtue of the synchronization, the wireless communication module 2 or RNA module knows the sending times of the second advertising events AD2 from the meter 1.

LIST OF REFERENCES

1 meter
2 wireless communication module
3 head-end
4 application
5 memory
6 microprocessor
7 radio interface
8 battery
9 processor
10 memory
11 battery
12 radio interface
13 WAN interface
14 radio link
15 WAN interface
16 WAN connection
17 meter data
18 data collector
19 time-critical data
20 database
T1 data transfer interval
T1+n data transfer interval
AD1 first advertising events
AD2 second advertising events

The invention claimed is:

1. A method for wireless transmission of time-critical data from a battery-operated meter to a wireless communication module in a short-range wireless standard, the meter and the wireless communication module acting as master and slave or slave and master, the method comprising the following steps:

providing a meter and a wireless communication module being coupled in advance;

sending meter data from the meter to the wireless communication module over a wireless communication link;
the meter data differing from the time-critical data;
establishing an active link between the meter and the wireless communication module for sending the meter data and the time-critical data from the meter to the wireless communication module;
sending first advertising events to initiate establishing communication for transmitting the meter data;
sending second advertising events to initiate establishing communication for transmitting the time-critical data; and
causing the wireless communication module to act as the slave, using the wireless communication module as the slave to send out the second advertising events and upon an occurrence of a time-critical incident, using the meter as the master to start to scan for the second advertising events to establish the wireless communication link between the meter and the wireless communication module.

2. The method according to claim 1, wherein the time-critical data are alarm data, the battery-operated meter is a consumption meter and the communication module is battery-operated.

3. The method according to claim 1, which further comprises sending out the second advertising events periodically.

4. The method according to claim 1, which further comprises providing the second advertising events with a periodicity being higher than a periodicity of the first advertising events.

5. The method according to claim 1, which further comprises sending out the second advertising events only over a predefined time period.

6. The method according to claim 5, which further comprises initiating establishing communication for transmitting the meter data at fixed times.

7. The method according to claim 6, which further comprises sending out the second advertising events between the fixed times within defined time intervals.

8. The method according to claim 1, which further comprises transmitting the time-critical data coming from the meter from the wireless communication module to a head-end.

9. The method according to claim 8, which further comprises transmitting the time-critical data by WAN technology.

10. The method according to claim 1, which further comprises synchronizing the meter and the wireless communication module with each other with regard to at least one of sending-out or receiving the second advertising events.

11. The method according to claim 10, which further comprises carrying out the synchronizing step whenever communication is established for transmission of the meter data.

12. The method according to claim 1, which further comprises:
before a timed use of the second advertising events:
placing the meter in a sleep or listening state and placing the wireless communication module in an idle mode, or
placing the meter in an idle mode and placing the wireless communication module in a sleep or listening state.

13. The method according to claim 1, which further comprises installing at least one of the meter or the wireless communication module in a fixed position.

14. The method according to claim 1, which further comprises transmitting time-critical data from a plurality of meters to one or more wireless communication modules in a network.

15. The method according to claim 1, which further comprises using the BLE short-range wireless standard as the short-range wireless standard.

* * * * *